United States Patent
Goebel et al.

(10) Patent No.: US 6,471,022 B1
(45) Date of Patent: Oct. 29, 2002

(54) METHOD AND DEVICE FOR ACTUATING A MOTOR VEHICLE CLUTCH DEVICE

(75) Inventors: Christoph Goebel, Immenstaad (DE); Gerhard Bailly, Friedrichshafen (DE); Martin Spiess, Uhldingen (DE); Willibald Probst, Wangen (DE); Oliver Rumpf, München (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/720,614

(22) PCT Filed: Jul. 3, 1999

(86) PCT No.: PCT/EP99/04634

§ 371 (c)(1),
(2), (4) Date: Dec. 20, 2000

(87) PCT Pub. No.: WO00/03159

PCT Pub. Date: Jan. 20, 2000

(30) Foreign Application Priority Data

Jul. 10, 1998 (DE) .......................... 198 30 950

(51) Int. Cl.⁷ .............................................. F16H 47/00
(52) U.S. Cl. ........................................ 192/3.58; 474/8
(58) Field of Search ........................... 192/3.51, 3.54, 192/3.55, 3.57, 3.58, 3.63, 21, 51, 87.12; 477/39, 44, 46, 48; 701/53; 474/8, 22

(56) References Cited

U.S. PATENT DOCUMENTS

| 4,436,193 A | * | 3/1984 | Smirl ...................... 192/107 C |
| 4,651,142 A | | 3/1987 | Klatt .......................... 340/679 |
| 5,189,611 A | * | 2/1993 | Petzold et al. ................. 701/58 |
| 5,672,132 A | * | 9/1997 | Schwab ......................... 474/8 |

FOREIGN PATENT DOCUMENTS

| DE | 33 31 266 C2 | 2/1988 |
| DE | 195 22 833 A1 | 1/1997 |
| EP | 0 137 247 B1 | 4/1985 |
| EP | 0 918 175 A2 | 5/1999 |
| WO | 97/01049 | 1/1997 |

OTHER PUBLICATIONS

Japanese Abstract, vol. 7, No. 217 (M–245) dated Sep. 27, 1983 to Aishin Warner Ltd.
Japanese Abstract, vol. 199, No. 707 dated Jul. 31, 1997 to Toyota Motor Corp.

* cited by examiner

Primary Examiner—Richard M. Lorence
(74) Attorney, Agent, or Firm—Davis & Bujold, P.L.L.C.

(57) ABSTRACT

A method and a device for actuating a motor vehicle clutch device (4). A control device (12) automatically influence the frictional power of the clutch device (4) in accordance with predetermined criteria (19) by varying the continuously variable ratio of a vehicle transmission (2).

7 Claims, 3 Drawing Sheets

METHOD AND DEVICE FOR ACTUATING A MOTOR VEHICLE CLUTCH DEVICE

FIELD OF THE INVENTION

The invention relates to a method and device for actuating a motor vehicle clutch device and for control or regulation of the transmissible input torque and the frictional power of the clutch device, especially for a reversing clutch device placed in a vehicle power train which contains a continuously variable ratio transmission.

BACKGROUND OF THE INVENTION

A hydrostaic mechanical power split transmission with continuously variable ratio and a reversing clutch device consisting of a multi-disk clutch for forward motion and a multi-disk clutch for reverse motion on the transmission output has been disclosed in WO 97/01049. By alternatively using the two clutches $K_v$ and $K_r$, the direction of travel of the vehicle can be reversed at low speeds. For example, this means that the clutch $K_r$ is closed already with pressure modulation while the vehicle still moves forward. Starting from a specific modulation pressure, the formerly closed clutch $K_v$ opens and the forward moving vehicle decelerates until parked, via the clutch $K_r$, and then accelerated in reverse direction of travel. The actually adjusted ratio of the transmission remains constant during the reversal operation. It will only be changed again after the reversal via the clutches $K_v$ and $K_r$ has terminated. Thereby obtaining with great shifting comfort and quick reverse gear shifting without interrupting the traction force of the power train of the vehicle.

The invention can be implemented with the known power split transmission and for, but not limited to, agricultural vehicles such as farm tractors and other tractors.

The vehicle input torque transmissible by a clutch in clutch-slip operation depends upon the adjustment of a clutch pedal of a vehicle and on the nature of the road. The so-called inch function (possibility of slip operation of the clutch) allows for the continuous variation of the input torque transmissible by the clutch, in the instant example, the reversing clutch device, through the driver with the aid of the clutch pedal position. The quantitatively regulated limitation of the input torque during practical utilization of the vehicle is indispensably needed, such as when starting on slippery soil or when docking on other equipment.

The rotation angle sensor on the clutch pedal or on a separate inch pedal produces a stress which corresponds to the pedal position and is processed in an electronic control unit. The tension is then converted to the inch effect which is between 0% and 100%. A 100% inch effect means that the reversing clutch device is open and a 0% inch effect means reversing clutch device is closed and that the input train is also closed.

In known tractor transmissions, the clutch pressure and thus the maximum transmissible input torque between 0 bar and a maximum value such as of 18 bars, are adjusted according to the inch effect. Like in the tractor transmissions already known, a rotational speed difference of more or less magnitude would appear over the reversing clutch device (through drive degree) according to the motor rotational speed, adjusted transmission ratio and the slowed down input torque on the output side of the reversing clutch device. The adjusted clutch pressure and the differential rotational speed between the input side and the output side of the reversing clutch device are a measure for the frictional power appearing in the reversing clutch device.

In the transmissions known, the reversing clutches are dimensioned for heavy loads so that burn out will occur under permanent operation with the inch function. To make permanent operation with slipping clutches at all driving speeds possible, new methods are needed to implement the use without limitations of the inch effect and at the same time to protect the clutches.

According to the invention, the problem is solved for a vehicle power train containing a transmission with continuously variable ratio and a clutch device utilizable in the slip operation, by providing a valuable possibility of operating the clutch device in friction-slip operation for a longer time than in the known driving systems without the clutch friction elements burning out or requiring an especially oversized clutch.

This problem is solved according to the invention by the characteristic features of Claim 1.

SUMMARY OF THE INVENTION

An essential idea of the invention consists in preventing too high frictional power or overheating of the clutch device not by changing the clutch closing pressure and/or the slipping time when opening and/or closing the clutch device, but by a predetermined automatic limitation, control or regulation of the rotational speed difference between the input side and the output side of the clutch device by an adequate control or regulation of the ratio of the transmission or of the rotational speed of the prime mover according to a predetermined parameterizable value or according to a parameterized value range, or according to the temperature and/or the frictional power of the clutch device. In this invention, the differential rotational speed of the clutch device is preferably modulated by varying the transmission ratio in the inch operation. In tractors or other mobile machines, so-called PTO motor, rotational speeds are often constantly in demand so that the needed variation of the motor rotational speed excludes itself. The frictional power can be measured in different ways or calculated by an electronic control device. The automatic calculation can be carried out according to the rotational speed difference between the input side and the output side of the clutch device, to clutch closing pressure and/or to the torque transmitted by the clutch device.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
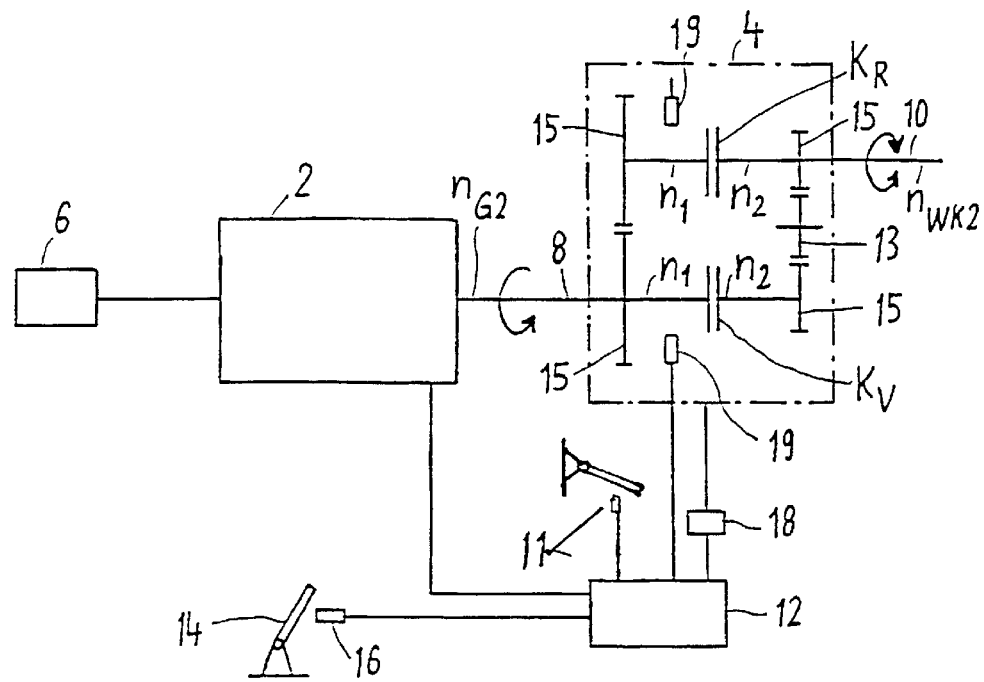
FIG. 1 diagrammatically shows a power train of a motor vehicle according to the invention.

The power train of a motor vehicle shown in FIG. 1 contains one transmission (2) having a continuously variable ratio and a reversing clutch device (4) on the transmission output. The transmission (2) with automatically continuously variable ratio can have gear wheels or other rotation elements to produce a corresponding ratio of demultiplication between the input side and the output side of the transmission. The transmission input is attached to a prime mover (6). The reversing clutch device (4) contains a clutch $K_v$ for forward motion and another clutch $K_r$ for reverse motion. Both clutches $K_v$ and $K_r$ are hydraulically actuatable multi-disk clutches. The clutch input shaft (8) is attached to the output of the transmission (2) and turns at the rotational speed thereof $n_{G2}$. The clutch output shaft (10) is drivingly connected with vehicle wheels (not shown) and turns at a rotational speed $n_{wk2}$ in one or the other direction of rotation depending on whether the clutch $K_v$ for forward motion or the clutch $K_r$ for reverse motion is closed When on a selector device (11) of an electronic control device (12) the driver selects to travel in the reverse direction before the vehicle stops, both clutches $K_v$ and $K_r$ have friction slip during a transition phase, as described above for the power split transmission of WO 97/01049.

To change direction of rotation of the clutch output shaft (10), gear wheel (13) is placed in the reversing power train of the clutch $K_v$ thus having one more gear than in the reversing power train of the other clutch $K_r$. The other gear wheels are designated with (15).

Both clutch $K_v$ and $K_r$ of the reversing clutch device (4) are controlled or regulated by the electronic control device (12) according to a clutch pedal (14) the position of which is communicated by a sensor (16) to the electronic control device (12) and depending on a change of travel direction on the selector device (11). The electronic control device (12) controls the hydraulic fluid of a hydraulic device (18) with which the clutches $K_v$ and $K_r$ can be actuated against a spring tension.

Through sensors (19), the control device (12) receives data such as temperature, torque, actuation pressure and/or rotational speeds of the clutches on the input side $n_1$ and the output side $n_2$ of the clutch device (4). In addition, the control device (12) is connected according to control with the transmission (2).

The clutches $K_v$ and $K_r$ can be operated by the driver for an extended period of time or in permanent operation with friction-slip according to the position of the clutch pedal (14) without burn out of the clutch-friction elements, steps are provided in the electronic control device (12) with which the ratio of the transmission (2) is automatically and continuously adjusted according to the frictional power or temperature in the clutches so that the frictional power does not exceed predetermined values or value ranges. The electronic control device automatically adjusts the reduction ratio of the transmission (2) so that the rotational speed difference between the input rotational speed $n_1$ and the output rotational speed $n_2$ of the clutch $K_v$ and/or $K_r$ is limited to a specific maximum value or is kept at a predetermined value in order to limit the frictional power and the temperature of one of the two clutches $K_v$ and/or $K_r$. In the electronic control device (12) corresponding nominal values or nominal value curves can be stored or preset by a computer program.

Figure 2:
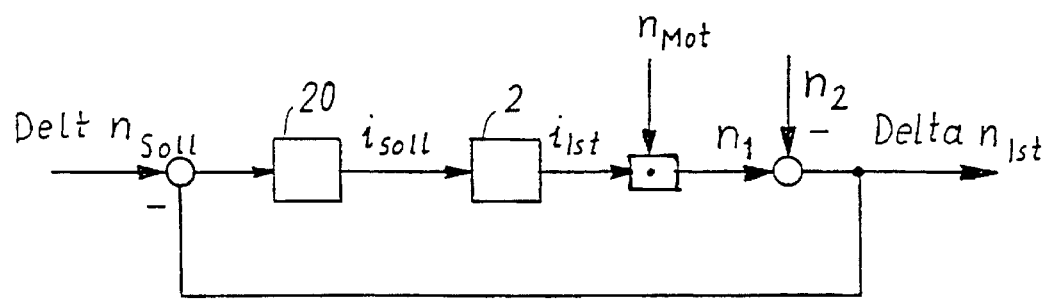
FIG. 2 diagrammatically shows a shift pattern of a regulator circuit for the inch function.

FIG. 2 shows a regulation diagram which is implemented in the electronic control device (12). Depending on the existing position of the clutch pedal (14) and stored nominal values or nominal value ranges there results a specific nominal differential rotational speed delta-$n_{soll}$. A regulator (20) produces a nominal value $i_{soll}$ for the ratio of the transmission (2). The ratio actual value $i_{ist}$ of the transmission (2) yields, in accordance with the rotational speed $n_{mot}$ of the prime mover (6), the input rotational speed $n_1$ of the clutch $K_v$ and/or $K_r$ concerned. The signal of difference from the actual rotational speed difference delta-$n_{ist}$ and the nominal rotational speed difference delta-$n_{soll}$ is fed to the regulator (20) as output error.

Herebelow are described three different examples of the method:

1. Variation of the transmission ratio to limit the rotational speed difference according to the clutch pedal position.

The continuously variable ratio of the transmission (2) is adjusted during operation with inch effect in a manner such that a parameterizable maximum rotational speed difference on the concerned clutch $K_v$ and/or $K_r$ of the reversing clutch device (4) is not exceeded. The maximum rotational speed difference on the concerned clutch $K_v$ and/or $K_r$ of the reversing clutch device (4) is parametered via a characteristic line according to the inch effect, as shown by way of example in FIG. 3.

Figure 3:
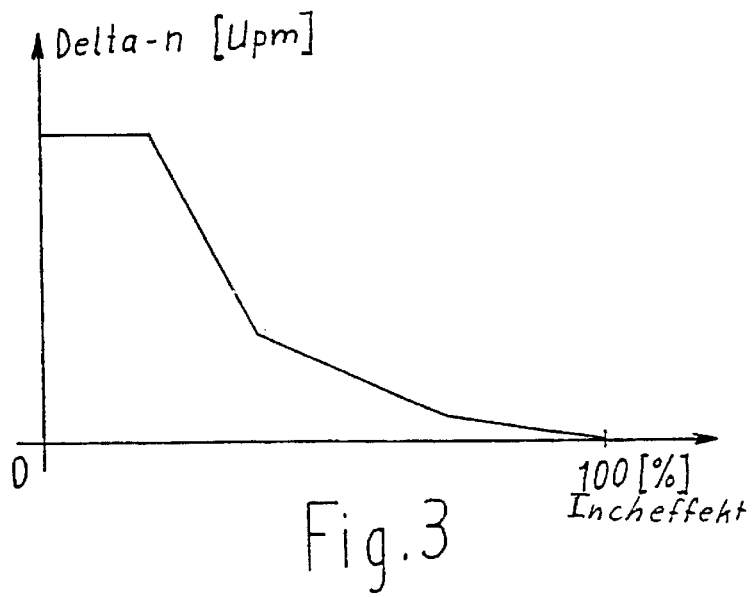
FIG. 3 is a diagram showing the quantitative curve of an inch characteristic line wherein on the horizontal axis the inch effect is plotted in percent and on the vertical axis is plotted the nominal rotational speed difference delta-$n_{wk}$ between the input side and the output side of a clutch of the reversing clutch device.

FIG. 3 shows on the horizontal axis the inch effect in percent and on the vertical axis the nominal rotational speed difference $n_1$-$n_2$ indicated in delta-n(Upm) between the input side and the output side of the clutch $K_v$ or $K_r$, When the clutch pedal (14) is forced through, which corresponds to the maximum inch effect, the rotational speed difference zero is preferably preset in order to prevent rolling back or creeping back of the vehicle as result of a residual drag torque on the clutch. A quantitatively regulated start of the motor vehicle is assisted by allowing a strongly pressed clutch pedal (14) only a small rotational speed different $n_1$-$n_2$. The rotational speed difference increases all the more as the clutch pedal (14) is further released and is limited to the maximum admissible rotational speed difference.

In an acceleration process or a deceleration process of the vehicle during inch operation, the rotational speed difference $n_1$-$n_2$ must not exceed the maximum admissible rotational speed difference. This is obtained by the fact that the transmission ratio is adjusted with a view to nominal ratio only to the extent that the admissible rotational speed difference is not exceeded. The ratio of the power train is composed of the ratio of the transmission (2) and the ratio in the reversing clutch device (4). When the ratio in the transmission (2) has reached its nominal value, then the slip in the clutch $K_v$ or $K_r$ determines the difference from the nominal ratio of the transmission. If the intended ratio is reached, the differential rotational speed zero appears under sufficient clutch pressure on the force-transmitting clutch. Due to external influences (change of the road), when the vehicle is accelerated or decelerated, then the synchronization is effected afterward with the differential rotational speed $n_1$-$n_2$. An example of this is shown in FIG. 4.

Figure 4:
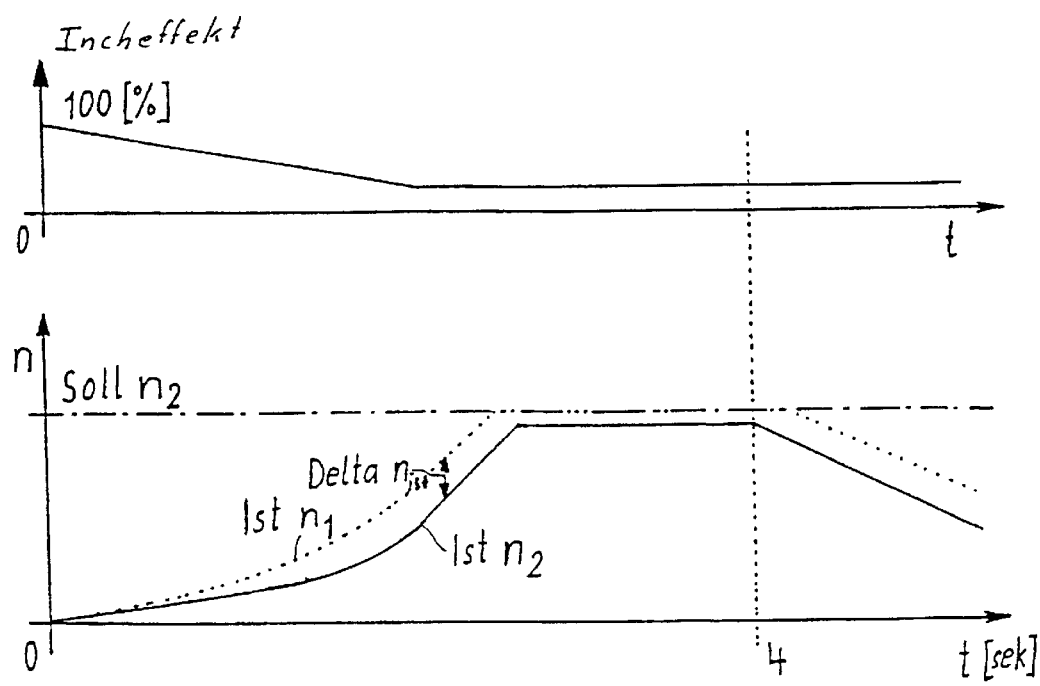
FIG. 4 shows two superimposed, correlated diagrams wherein the inch effect according to time is shown in the upper diagram and the rotational speeds according to time are shown in the lower diagram.

The upper diagram of FIG. 4 shows the inch effect according to time. On the horizontal axis is plotted the time t and on the vertical axis is plotted in percent the inch effect.

In the lower diagram of the FIG. 4, the time t is plotted on the horizontal axis and the rotational speed n on the vertical axis.

A dotted line parallel with the time axis t shows the nominal value soll-$n_2$ of the output rotational speed of one of the two clutches $K_v$ or $K_r$. A curve shown in solid line corresponds to the actual value ist-$n_2$ of the output rotational speed of the clutch $K_v$ or $K_r$. It lies by an amount delta-$n_{1-2ist}$ lower than the actual value curve ist-$n_1$ plotted in dotted line of the input side rotational speed of the clutch $K_v$ or $K_r$ conditioned by the inch effect of the upper diagram of FIG. 4. If a possible transmission ratio in the reversing clutch device (4) is disregarded, then the dotted line ist-$n_1$ corresponds simultaneously to the output rotational speed $n_{G2}$ of the continuously variable transmission 2.

It is assumed in FIG. 4 that during the time t=4 sec a heavy load appears on the outside of the reversing clutch device (4).

To maintain the maximum rotational speed difference, the transmission ratio is following up.

2. Limitation of the differential rotational speed of the clutch $K_v$ and $K_r$ to a fixed limit value.

The inch function is mostly necessary at low speeds. Up to a limit speed, there are no differences between the inch function described here and the already known tractor transmission. This means that the nominal ratio is adjusted by the continuously variable transmission and the pressure required adjusted via the clutch pedal on the clutch $K_v/K_r$. The limit speed is determined by the maximum admissible differential rotational speed of the reversing clutch $K_v$ and/or $K_r$ which the reversing clutch permanently bears. According to the invention, the continuously variable ratio of the transmission (2) in the inch operation is adjusted with reference to the ratio requirement so that a parameterizable limit ratio and therewith a parameterizable limit speed of the motor vehicle is not exceeded. In ratios or ratio requirements in the inch operation which are above the limit value, the rotational speed difference of the clutch is limited to a limit value and the ratio of the transmission (2) is varied accordingly.

3. Monitoring of the frictional power of the reversing clutches $K_v$ and $K_r$.

According to this variant of the invention, in inch operation the frictional power of the clutches is determined steadily with the aid of the differential rotational speed between the input side and the output side of the clutches $K_v$ and/or $K_r$, the clutch actuation pressure and physical constants of the clutches. Another possibility consists in a temperature sensor detecting the temperature of the clutches.

When the frictional power or temperature of one of the clutches $K_v$ and/or $K_r$ exceeds a parameterizable limit value, steps to protect the clutch are taken. As far as possible the steps must not impair the actual driving state of the vehicle. One such step can consist in lightly raising the clutch pressure to reduce the slip in the clutch. When the step shows no effect, then the ratio of the transmission (2) must be followed up so that the rotational speed difference between the input side and the output side of the clutch is reduced and thereby its frictional power lowered.

Herebelow the reversing clutch device (4) is described in detail:

In general:

The reversing device (4) situated upon the output side of the continuously variable transmission (2) allows a separation of the flux of force between the transmission (2) and the output of the power train. Thereby the transmission (2) can be adjusted, e.g. by a certain ratio, without consequences upon the output of the power train.

Engagement and disengagement of the two reversing clutches $K_v$ and $K_r$:

The engagement and disengagement of the clutches $K_v$ and $K_r$ are controlled by an automatic state of the electronic control device (12). It generates the control commands for the clutches according to the actual driving state and to the desired driving states. The control commands respectively introduce different operations such as the filling or closing of the clutches.

Modulation of the clutch pressure in the reversing clutches $K_v$ and $K_r$:

The pressure and thereby also the maximum transmissible torque in the clutches are continuously modulated between 0 bar and a maximum value of 18 bars. The modulation results in accordance with the momentary driving situation. In certain driving situations, the required pressure is directly deduced from the input signals of the electronic control device (12), in the inch operation, e.g. from the inch effect and thus from the position of the clutch pedal (14).

Figure 5:
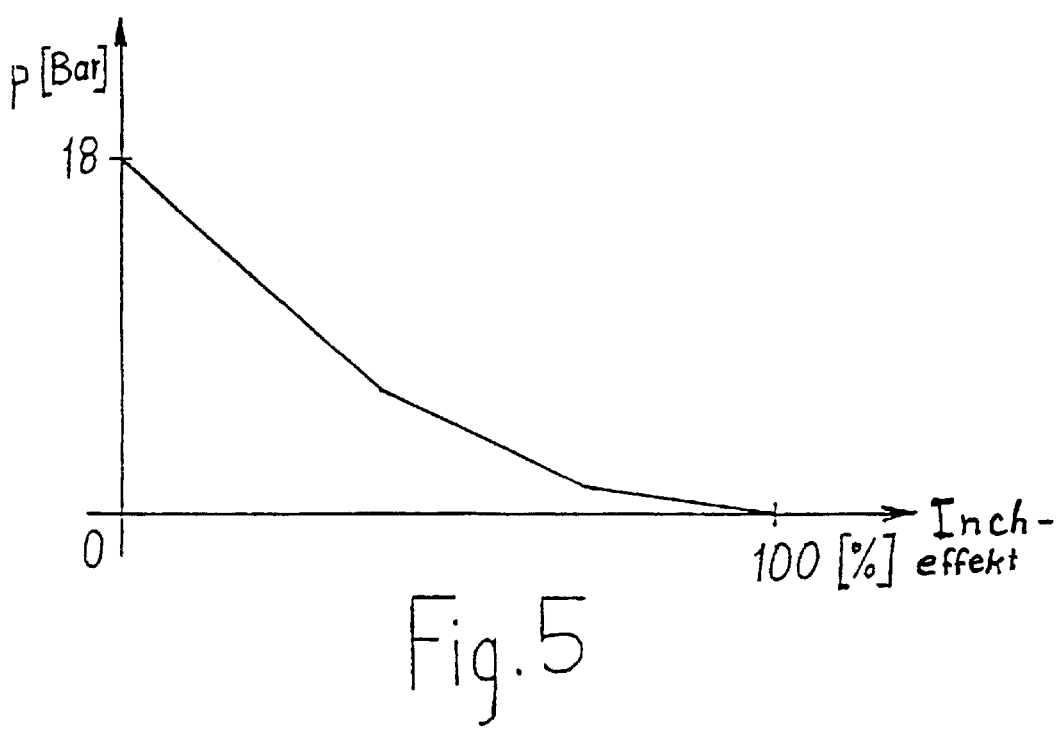
FIG. 5 is a diagram showing the quantitative curve of the inch pressure wherein the inch effect in percent is plotted on the horizontal axis and the appertaining actuation pressure of the clutch is plotted on the vertical axis.

FIG. 5 shows in bars the dependence of the actuation pressure of the clutches on the inch effect which is plotted in percent on the horizontal axis. The curve shows the quantitative course of the inch pressure.

In other driving states the nominal pressure of the clutches is obtained as a function in the course of time from a characteristic line or from a functional interrelation.

Determining the pressure of the clutches depends upon the temperature, on the rotational speed of the motor (6) and on the construction of the clutch itself. The pressure curves of the actuation pressures of the clutches are adapted to the different driving state transitions such as a parked vehicle, forward motion or reverse motion.

One other situation where the clutches have to be protected from overheating is the change of the driving states.

From neutral or parked vehicle to forward motion or reverse motion:

In this transition, by adjusting the ratio of the transmission (2), the differential rotational speed between the input side and the output side of the clutch $K_v$ or $K_r$ which corresponds to the momentary travel direction, is reduced. If the differential rotational speed is exceeded, then the clutch is engaged (closed) depending on the momentary output rotational speed. If the output rotational speed corresponds to the desired travel direction or is within a tolerance tape by zero, then the clutch corresponding to the desired travel direction is closed; otherwise the other clutch.

The limit value for the rotational speed difference depends on the maximum frictional power admissible on the clutch.

The clutch is engaged ( closed) in several phases. First the clutch is filled with hydraulic fluid. Then follows the closing phase.

The phases are controlled according to time and the nominal pressure is generated from a characteristic line.

During inch operation the closing phase controlled by time of the clutch is terminated at the moment when the nominal pressure corresponds to the pressure preset by the clutch pedal position. Starting from this moment, the hydraulic actuation pressure of the clutch is modulated according to the inch effect.

Neutral:

When changing the driving state to "neutral" both clutches $K_v$ and $K_r$ are simultaneously opened. The duration the opening phase is obtained from a characteristic line.

Reference Numerals 2 transmission with continuously variable ratio
4 reversing clutch device
6 prime mover
8 clutch input shaft
10 clutch output shaft
11 selector device for reversal of travel direction
12 electronic control device
13 gear wheel
14 clutch pedal 15 rear wheels
16 sensor
18 hydraulic device
19 sensor
20 regulator

What is claimed is:

1. A method for actuating a clutch device and controlling frictional power of the clutch device in a motor vehicle and affecting the frictional power and a temperature of the clutch device and the clutch device being housed within a power train containing a continuously variable ratio transmission, the method comprising the steps of:

adjusting a continuously variable ratio of the transmission so that a maximum rotational speed difference between an input side and an output side of the clutch device is not exceeded; and controlling the continuously variable ratio of the transmission so that a rotational speed difference between the input side and the output side of the clutch device corresponds to one of a fixed nominal value, a variable nominal value or a nominal value range.

2. The method according to claim 1, further comprising the step of, when the frictional power exceeds a set value, changing the ratio of the transmission so that the rotational speed difference between the input side and the output side of the clutch device is reduced and the frictional power is also reduced.

3. The method according to claim 2, further comprising the step of calculating the frictional power with the aid of the rotational speed difference between the input side and the output side of the clutch device, an actuating pressure and specific physical constant values of the clutch device.

4. The method according to claim 1, further comprising the step of superimposing the influence of the frictional power, which results by the variation of the ratio of the transmission, on a clutch pressure preset on a clutch pedal.

5. The method according to claim 1, further comprising the step of providing the clutch device with a hydraulic actuation pressure that is measured from a minimum value to a maximum value and modulating the hydraulic actuation pressure according to a reduction ratio of the transmission and to a momentary driving situation.

6. The method according to claim 1, further comprising the step of varying the ratio of the transmission according to the temperature of the clutch device.

7. The method according to claim 1, further comprising the step of using a reversing clutch as the clutch device.

* * * * *